United States Patent Office 3,160,242
Patented Dec. 8, 1964

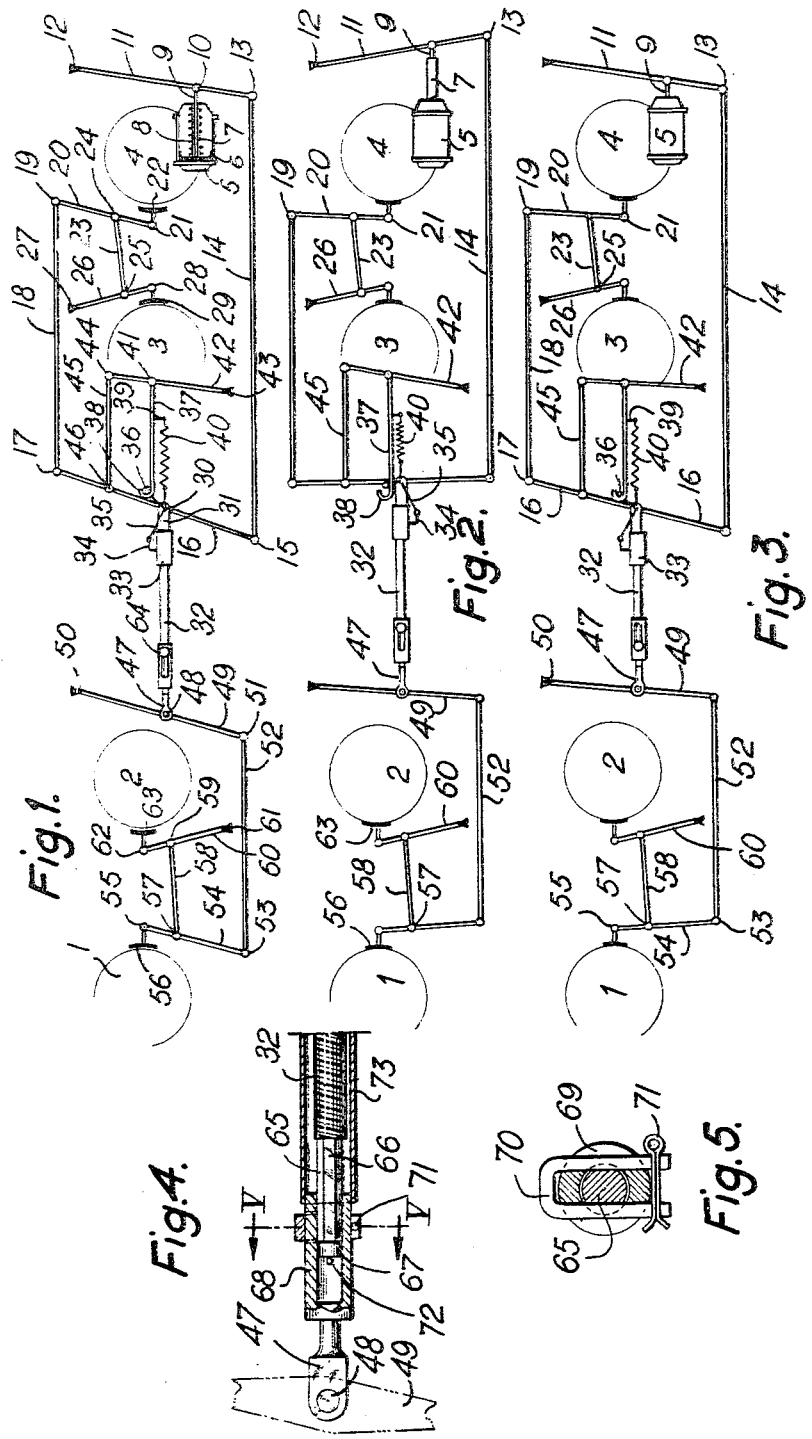

3,160,242
BRAKE ADJUSTMENT DEVICE FOR NON-
RETURN LINKAGES
Jules Emile Joseph Feuilly, Paris, France, assignor to
Societe Generale "Isothermos," Paris, France
Filed Sept. 7, 1962, Ser. No. 222,089
Claims priority, application France, Mar. 6, 1962,
890,198
7 Claims. (Cl. 188—202)

This invention relates to control devices which are adapted for being interposed between double-acting brake adjusters and linkage systems for brake shoes.

Certain automatic double-acting brake adjusters that are designed to adjust the stroke of the brake shoes operate by an elongation or a shortening of the stroke of the power piston required to apply said shoes. The automatic elongation or shortening of devices of this type is usually tripped or arrested, respectively when the stroke of the brake shoes is not correct, and under such conditions both operations are effected by a control means connected to the brake linkage system.

When a definite relationship exists between the position of the brake linkage and that of said control means, it is essential that when the brake is released, said linkage returns all the way to an initial inoperative position if the adjuster is to work properly.

A linkage system of this type is accordingly associated with a return spring of adequate strength to return the linkage system to its initial position. On the other hand, the presence of such a spring has the disadvantage that it absorbs, in detrimental fashion, a certain fraction of the braking force exerted when applying the brakes. For this reason, certain railway authorities have required that such a spring be dispensed with, notwithstanding the disadvantage incurred of slight friction of the brake shoes against the steel rims of the wheels under certain running conditions and especially just after the brakes have been released.

The elimination of this spring makes it compulsory to use special brake linkage adjusters, which do not usually function perfectly.

This invention has for an object to provide means whereby ordinary adjusters can be used with linkages of the type referred to while at the same time ensuring that such normal adjusters operate satisfactorily.

To this end, this invention relates to a junction device between an adjuster and an associated linkage member, said device embodying a substantially endwise lost motion device the magnitude of which lost motion is equal to the travel of the attachment point on the linkage when the latter is moved through an amplitude equal to the distance between the position of said point when the brake shoes are applied without pressure and the brake actuator is fully retracted and the position of that same point when the brake actuator is retracted and said linkage has returned to the fully-released position, namely to the position wherein said brake shoes are spaced from the wheel rims.

In the case of a reversible-screw-type automatic adjuster, said junction device provides a substantially axial free motion and comprises means for preventing any relative rotation between the attachment point of the adjuster and a nut, of said adjuster.

In this way, vehicles that are prone to the drawback mentioned precedingly can be equipped with conventional adjusters embodying absolute functional corrective means.

The description which follows with reference to the accompanying drawing, filed by way of example only and not of limitation, will give a clear understanding of how the invention may be carried into practice.

Referring to the drawing filed herewith:

FIG. 1 is a diagrammatic illustration of the braking system on a vehicle provided with two pairs of axles, the system being represented with the linkage in a fully retracted position of release.

FIG. 2 shows a similar linkage in the position of application of the brakes.

FIG. 3 illustrates the configuration of the linkage when the brakes are released, but showing said linkage in a partly retracted position.

FIG. 4 is a fragmentary sectional view on an enlarged scale of the attachment of said adjuster to a brake linkage component.

FIG. 5 is a sectional view on an enlarged scale taken along the lines V—V of FIG. 4.

The embodiment illustrated by way of example relates to a brake linkage system for a vehicle having two pairs of axles 1, 2, 3 and 4, and this system is actuated by a brake cylinder 5 in which slides a piston 6 fitted with a hollow rod 7. The power stroke of said piston is made against a resisting spring 8 which is supported in the cylinder 5 disposed about said hollow rod 7. The latter contains a thrust link 9 pivotally connected at 10 to a main braking lever 11, which lever is pivotally connected at one of its extremities to a fixed point 12, the other extremity being pivotally connected at 13 to a braking draw-link 14.

The other extremity of draw-link 14 is pivotally connected at 15 to one extremity of a rocker 16, the other extremity of which is pivotally connected at 17 to one extremity of a draw-link 18, the other extremity of which is in turn pivotally connected at 19 to a brake shoe rocker 20. On its end remote from hinge-point 19, said rocker 20 is provided with a pivotal connection 21 for supporting a brake shoe 22, which brake shoe is adapted to bear against an associated wheel on axle 4. An intermediate draw-link 23 has one of its ends pivotally connected to an intermediate point 24 on rocker 20. The other extremity of draw-link 23 is pivotally connected at 25 to a link 26, one end of which link swings about a stationary point 27, while the other extremity is pivotally connected at 28 to a brake shoe 29 associated to one of the wheels mounted on axle 3.

Rocker 16 has a fulcrum support at 30 by being connected to the clevis 31 of a reversible screw linkage adjuster 32, and the operating sleeve 33 of said adjuster is provided with an adjusting crank 34 hinged to a tilter 35 which pivots about the fulcrum support 30, said tilter being shaped like a bell-crank, the free end of which cooperates through a pin 36 with a slide 37 terminating in a hook means 38.

Said slide 37 is connected by a pin 39 to a compression spring 40 which is in turn connected to fulcrum 30. Said slide is pivotally connected at 41 to a link 42, one end of which swings about a stationary point 43 while the other extremity is pivotally connected at 44 to a draw-link 45. Draw-link 45 is connected in turn at pivot 46 to rocker 16, said pivot 46 being located between connection point 17 and connection point 30.

The terminal eye 47 of adjuster screw 32 is connected to a stub axle 48 positioned intermediately on a rocker 49 one extremity of which is pivotally connected to a fixed point 50 and the other extremity pivotally connected at 51 to the end of a draw-link 52. The draw-link 52 is pivotally connected at 53 to a rocker 54 the other extremity of which is in turn pivotally connected at 55 to a brake-shoe 56 adapted to be applied against a wheel mounted on axle 1. Said rocker 54 is connected at pivot 57 to one end of an intermediate draw-link 58 the other end of which is pivotally connected at 59 to a link 60. One extremity of said link 60 swings about a stationary point 61 while the other extremity is pivotally connected at 62 to a brake-shoe 63 adapted to be applied against a wheel mounted on axle 2.

Thus the brake-shoes are arranged in pairs between each pair of wheels. Of course, it will be understood that the controls operating off draw-links 18 and 52 are sub-divided to co-act with the brake shoes and the wheels disposed on each side of the vehicle, the schematic illustration hereinbefore described being restricted, in the interests of greater simplicity on the drawing, to one side only of the vehicle.

Between the screw 32 and the eye 47 is interposed a slide 64 which introduces a degree of axial freedom between said screw and said eye but prevents any relative rotation therebetween.

As is more clearly shown in FIGS. 4 and 5, the screw 32, the thread of which is so inclined that the adjuster nut cooperating therewith is able to reversibly rotate, when free, in response to axially-exerted forces, comprises a cylindrical end section 65 having two flat portions 66. Said section 65 is provided with a cylindrical head 67 and the section 65 and head 67 are freely slidable in a blind socket 68 attached to eye 47. Through the socket 68 are provided two keyways 69, which keyways receive without endwise play a fork-shaped key 70 the prongs of which are inserted free of play in said keyways and straddle said flat portions 66 to permit sliding thereof. A pin 71 is adapted to interconnect the outer ends of the two prongs beneath socket 68.

Flush with the head 67, when the same is applied against key 70, said blind socket 68 is provided with a diametrical perforation 72 adapted to receive a locking pin.

The device hereinbefore described operates as follows:

In the position shown in FIG. 1 which corresponds to a fully released position of the brakes, the entire linkage system is retracted to an initial position wherein the brake shoes are entirely out of contact with the wheel rims. The piston 6 is fully retracted in the cylinder 5 under the action of spring 8. Spring 40 is in a position of maximum expansion and tends to push support 30 and pin 39 further apart thereby pressing pin 36 into hook 38. Adjuster crank 34, as the result of the engagement of pin 36 and hook 38 and the corresponding motion of tilter 35 and hence of adjuster sleeve 33, is in a position such that the adjuster nut is free.

If a fluid under pressure is now admitted into cylinder 5, the resulting swing of link 11 will cause a pull to be exerted on draw-link 14 and, through the medium support 30, on the adjuster.

As brake shoes 22 and 29 are applied against the rims of the wheels, hinge-point 17 becomes substantially stationary (neglecting elastic motion), while in the control system for sleeve 33, slide 37 moves over a shorter path than support 30, so that pin 36 separates from hook 38. Assuming the brake shoe clearances to be correct, sleeve 33 will then immobilize the adjuster nut and thereby cause clevis 31 to be rigidly connected to screw 32. The spring 40 will be compressed.

Since in junction 64, in the position occupied by the linkage components shown in FIG. 1, head 67 is applied against key 70, motion of rocker 16 will be transmitted via the hinge-point 48, the rigid adjuster 32 and the non-extensible junction 64, to the link 49, which link, more specifically through the medium of draw-link 52, will cause brake shoes 56 and 63 to be applied.

In the course of these various motions, crank 34 moves into the adjuster locking position shown in FIG. 2. This likewise applies to all the other components of the control system, of the brake linkage and of the brake actuator, the hollow rod 7 of which actuator projects out of cylinder 5.

Should the brake shoe clearances not be correct, the adjuster hereinbefore described would operate in conventional manner, either to provide an elongation (clearances too small), or to provide an initial shortening (clearances too big), provided that said shortening motion take place during travel of the brakes in the sense of application thereof.

When the compressed fluid escapes from cylinder 5, spring 8 has a strength just sufficient to return link 11, draw-link 14 and rocker 16 to the positions shown in FIG. 3. Similarly, spring 40, the strength of which is restricted to a small fraction e.g. 4% of that developed by piston 6, is just sufficient to provide the mutual motion between support 30 and slide 37 and to cause crank 34 of adjuster sleeve 33 to revert into the angular freeing sector of the nut associated to said adjuster. From this motion may be obtained a shortening of said adjuster in case of excessive brake-shoe clearances, provided that the adjuster and its control system are so designed that such shortening be obtained when the brakes are released (likewise in conventional manner).

Since no other elastic action is involved, the adjuster, thrust upon through support 30, is moved nearer to link 49 through the degree of play provided in junction 64. In response to this motion, the terminal cylindrical section 65 of screw 32 slides without rotation along its flat portions 66 between the prongs of key 70, the head 67 penetrating into socket 68, whereby the brake linkage system assumes the position shown in FIG. 3, wherein the brake shoes remain substantially in contact with the wheel rims but without exerting pressure against the same or causing them to be substantially restrained.

Under favorable conditions, the jolting caused by travel of the vehicle may return the brake shoes into a position spaced from the wheels. When this is the case, the system as a whole reverts to the positions shown in FIG. 1. When the opposite is the case, the extensibility of the adjuster will become effective only after the head 67 has returned into abutment behind key 70.

Thus it may be seen that when the system reverts to the position wherein the brakes are released, piston 6 and its rod 7 are alone to return under the action of spring 8. Spring 40 returns rocker 16 and the adjuster to their initial positions. Link 49 and the brake shoe linkages remain stationary and the head 67 moves through the clearance left between key 70 and the bottom of socket 68.

As the successive brake applications and releases take place, crank 34 moves from a locking position (FIG. 2) to an unlocking position (FIGS. 1 and 3) in regard to the adjuster nut. Should the locking position be close to the unlocking position reached by the linkage components and shown in FIGS. 1 and 3, locking of said adjuster is obtained in definite fashion with a small expenditure of energy even if no return motion whatsoever of the linkage takes place at the point where the brake shoes are located.

With an arrangement as hereinbefore described, such non-returned linkage system can therefore be adjusted by means of a conventional reversible adjuster whose operation is known to be particularly reliable.

The arrangement described hereinabove can be supplemented with advantage by mounting a tubular member 73, which forms an extension of socket 68, slidably and rotatably over a core member that can act as the adjuster nut if necessary, thereby providing advantageous complementary rigidity to the whole assembly as well as providing protection for the screw against the introduction of extraneous matter. Such rigidity is desirable in order to avoid undue gravity flexing of said adjuster in the inoperative position or as the result of inertia effects due to jolting during travel of the vehicle.

Normal operation of such an adjuster remains unaffected either during screwing in or screwing out of the device, due to the angularly rigid connection existing between the eye 47 and the extremity 65 of screw 32.

When it is desired to replace a brake shoe, a locking pin is inserted into the diametrical perforation 72 so as to obtain, if necessary manual assistance when releasing the brake, the maximum spacing between the wheel rims and the brake shoes to be replaced, which spacing will be obtained simultaneously on all the brake shoes when the linkage system is operated to that end.

While the present invention applies more particularly to railway vehicles and to brake shoes applied against wheel rims, the invention is by no means limited to such cases but extends also to the braking of vehicles of different types which make use of braking means other than shoes and which are adapted to co-operate with drums, discs or like members.

While there has been described and illustrated, the presently preferred embodiment of the brake adjuster of this invention, it will be understood by those skilled in the art that many modifications or substitutions of parts may be made without departing from the scope of the invention.

What I claim is:

1. In a braking device for a vehicle having wheels, the provision of braking means for being applied against said wheels, brake actuation means for operating said braking means and having extended and retracted positions for respectively applying the braking means against the wheels and releasing the braking means, linkage means between said brake actuation means and said braking means and having a fully released relaxed position in which the braking means is spaced from the wheels, linkage adjuster means connected to the linkage means for adjusting the clearance between the braking means and the wheels during operation when the linkage means is in a relaxed position and the braking means is just in contact with the wheels and means connected to said adjuster means and the linkage means for providing lost motion between said adjuster means and the linkage means to enable the linkage means to remain in relaxed position as the linkage means moves to the fully released position in which the braking means is properly spaced from the wheels, said linkage adjuster means including an adjuster body connected to the linkage means and a reversible screw within said body, said means connected to said adjuster means and to the linkage means comprising means connecting said adjuster body to said linkage means and means slidably connecting said reversible screw and said linkage means with limited longitudinal movement.

2. In a braking device as claimed in claim 1 wherein said means slidably connecting said reversible screw and said linkage means comprises an extension on said screw having flat portions, a fork shaped key including prongs mounted astride said flat portions of said extension, a blind socket accommodating said extension for sliding movement, said key being mounted on said socket, and a head on said extension for abutting said key to limit the movement of the screw, said socket being hingedly connected to said linkage means.

3. In a braking device as claimed in claim 1 wherein said linkage means includes a slide, means connected to said slide and to said linkage adjuster body for controlling the latter in accordance with movement of the slide, and a compression spring connected to the slide and to the linkage means at the location where the body is connected to the linkage means.

4. In a braking device as claimed in claim 3 wherein said brake actuation means is effective to apply a force of determinable magnitude to said braking means and the compression spring has a strength limited to approximately 4% of the strength of the brake actuation means.

5. In a braking device as claimed in claim 4 wherein said brake actuation means includes a spring resisting actuation and connected to said linkage means to apply a force thereto just sufficient to return the linkage means to a free position in which the brake means is applied without force to said wheels, said compression spring being effective with the braking means released by the brake actuation means to cause movement of the slide with respect to the location where the adjuster body is connected to the linkage means to activate the means connected to the slide and to the linkage adjuster body.

6. In a braking device as claimed in claim 5 wherein said slide has an end with a hook thereon, and said means connected to said linkage adjuster body includes a pin for engaging with said hook.

7. In a braking device as claimed in claim 6 wherein said compression spring exerts a force tending to engage said pin in said hook.

References Cited by the Examiner

UNITED STATES PATENTS

| | | | |
|---|---|---|---|
| 923,927 | 6/09 | Anderson | 118—202 |
| 2,062,497 | 12/36 | Browall | 188—202 |
| 2,436,850 | 3/48 | Bowen | 188—198 |
| 2,699,231 | 1/55 | Dorey | 188—198 |

ARTHUR L. LA POINT, *Primary Examiner.*

DUANE A. REGER, JOSEPH GOLDBERG, *Examiners.*